US00RE37464B1

(19) United States

(12) Reissued Patent

Meckler

(10) Patent Number: US RE37,464 E

(45) Date of Reissued Patent: Dec. 11, 2001

(54) DESICCANT ASSISTED MULTI-USE AIR PRE-CONDITIONER UNIT WITH SYSTEM HEAT RECOVERY CAPABILITY

(76) Inventor: Milton Meckler, 930 #2 20th St., Santa Monica, CA (US) 90403

(21) Appl. No.: 08/675,787

(22) Filed: Jul. 5, 1996

Related U.S. Patent Documents

Reissue of:

(64) Patent No.: 5,325,676
Issued: Jul. 5, 1994
Appl. No.: 07/933,782
Filed: Aug. 24, 1992

(51) Int. Cl.[7] ..... F25D 23/00

(52) U.S. Cl. ..... 62/93; 62/94; 62/271

(58) Field of Search ..... 62/94, 271, 93, 62/238.7

(56) References Cited

U.S. PATENT DOCUMENTS

| | | | | |
|---|---|---|---|---|
| 2,957,321 | | 10/1960 | Munters et al. . | |
| 2,959,930 | | 11/1960 | Munters . | |
| 2,968,165 | | 1/1961 | Norback . | |
| 3,200,606 | | 8/1965 | Hewett et al. . | |
| 3,470,708 | | 10/1969 | Weil et al. . | |
| 3,828,528 | | 8/1974 | Weil . | |
| 4,474,021 | | 10/1984 | Harband . | |
| 4,730,461 | | 3/1988 | Meckler . | |
| 4,738,120 | | 4/1988 | Lin . | |
| 4,739,624 | | 4/1988 | Meckler . | |
| 4,841,733 | | 6/1989 | Dussault et al. . | |
| 4,887,438 | | 12/1989 | Meckler . | |
| 4,930,322 | * | 6/1990 | Ashley et al. | 62/271 |
| 4,941,324 | | 7/1990 | Peterson et al. . | |
| 4,952,283 | * | 8/1990 | Besik | 62/271 X |
| 5,040,375 | * | 8/1991 | Von Dobeln | 62/271 X |
| 5,170,633 | | 12/1992 | Kaplan . | |
| 5,251,458 | * | 10/1993 | Tchernev | 62/271 |
| 5,353,606 | * | 10/1994 | Yoho et al. | 62/271 |
| 5,373,704 | * | 12/1994 | McFadden | 62/271 X |

* cited by examiner

*Primary Examiner*—Ronald Capossela

(74) *Attorney, Agent, or Firm*—Kramer Levin Frankel & Naftalis; Gregor N. Neff

(57) ABSTRACT

A dehumidifier unit for pre-conditioning air delivered to a multiplicity of separate refrigeration air conditioner units and especially ductless systems where the compressor-condenser unit is separate from the fan-coil unit, and assisted by heat pipe transfer of heat from air dehumidified through a desiccant wheel and by heat of compression from the condenser of one compressor-condenser unit, and with a heater to maintain the temperature of regeneration air through the wheel, one dehumidifier unit pre-conditioning air for a multiplicity of refrigeration air conditioners or fan-coil units.

43 Claims, 7 Drawing Sheets

DESICCANT ASSISTED MULTI-USE AIR PRE-CONDITIONER UNIT WITH SYSTEM HEAT RECOVERY CAPABILITY

Matter enclosed in heavy brackets [ ] appears in the original patent but forms no part of this reissue specification; matter printed in italics indicates the additions made by reissue.

PREFERRED EMBODIMENT

This invention relates to a versatile multi-use stand-alone dehumidifier unit adapted to pre-condition air in conjunction with, but not necessarily with refrigeration systems, whereby optimum humidity is attained in differing climatic conditions, waste heat being used when available for efficiency in the operation of both the dehumidification means and the refrigeration air conditioning means when combined therewith. Humidity has its effect upon building construction, as high humidity reduces the presence of mold and mildew, and can be controlled to levels which contribute to the elimination of bacteria propagating environments, For example, refrigeration air conditioner systems in humid environments are often inadequate with respect to acceptable humidity control, with or without refrigeration incorporated therein. And, in wet environments refrigeration air conditioner systems utilizing refrigerant cooled air coils are often overtaxed and their efficiency adversely affected. Humidity control becomes in important factor, not only as related to human comfort, health and to structural deterioration etc., but also as to adequacy of dehumidification and its efficient application. Accordingly, it is a general object of this invention to provide a versatile humidification controlling heat recovery unit adaptable to efficient operation in diverse climatic conditions, standing alone and/or in combination with air refrigeration systems. A feature of this stand-alone air pre-conditioner unit when combined with air conditioned refrigeration systems is increased efficiency of the refrigeration system while recovering waste heat therefrom that is advantageously employed in the efficient operation of said stand-alone air pre-conditioner unit.

State of the art practice for smaller commercial, institutional and industrial use buildings is to split the conventional package air conditioning system into small separately functioning units, with regard to the air handling, one section including circulating fan, filter, expansion valve and coil, and known as a fan-coil unit, and the other section involving the refrigeration machinery including compressor, condenser, receiver and the fixed piping, and known as the compressor unit. The condensers can be air cooled or water cooled, this practice of separation being known in the industry as "Ductless" of "Mini-Split" systems. And, in carrying out this practice, the air handling fan-coil unit and the compressor-condenser unit are separated, in order to facilitate installation and maintenance thereof. Thus, the fan-coil unit is readily adapted to optimum placement proximate to the conditioned space, while the compressor-condenser unit is adapted to optimum (remote) placement for noise abatement and servicing access. Accordingly, it is an object of this invention to provide a dehumidifier/humidifier with so-called Ductless or Mini-Split installations, and in the form of stand-alone air pre-conditioner units. That is, the air pre-conditioner unit or units disclosed herein is each a complete dehumidifier that is convertible to various air conditioning forms. Being "stand-alone" this pre-conditioner unit is operable independently, or it is operable in combination with refrigeration air conditioner systems. Characteristically, this stand-alone air pre-conditioner is adapted to be converted in its air ducting and in its heat source application, it being an object to provide internal ducting modifications that are compatible with variations in the application of outside air and exhaust air, as circumstances require with regard to prevailing environmental conditions.

It is an object of this invention to provide a basic dehumidifier, preferably of the desiccant type, wherein there are at least two columns of air, a first column of air that is dehumidifier, and a second column of air for regeneration. Also, a third column of air split off from incoming blower air for removal of heat and exhausted. Accordingly, it is another object of this invention to provide said basic unit with permanent ducting that is convertible to implement usable combinations of said three columns of air. And, it is still another object of this invention to provide selectively installed partitions that convert said permanent ducting to the usable combination of said three columns of air. In practice for example, efficient and effective dehumidification in a hot dry climate will require implementation of said third air column that directly exhausts heat removed from the first mentioned column of dehumidified air, whereas a wet humid climate will require utilization of said heat removal in the aforesaid regeneration column of air. A feature is the permanent unchanged ducting in this basic stand-alone pre-conditioner unit that is converted by the selective use of partitions of special configuration and each for a specific functional purpose, as shown and hereinafter described.

The process of dehumidification with desiccant adds heat to the column of air being treated, it being an object to remove this heat before it reaches the refrigeration cooling coil, and for this purpose a heat pipe is employed with its hot end in the dehumidified air side of the desiccant, in this embodiment a desiccant wheel. The cold side of the heat pipe is in the aforesaid second or third column of air and the heat absorbed therefrom and exhausted. In accordance with this invention, evaporative cooling of said second or third column of air can precede the heat pipe adsorption of heat extracted from the first column of supply air.

During a winter heating cycle, the desiccant wheel absorbs moisture from exhaust air and humidifies outside incoming air, and the heat pipe will automatically reverse its direction of heat flow and extracts heat from exhaust air and using it to pre-heat incoming cold air.

The process of dehumidifying with desiccant requires the regeneration or strengthening of the weakened moisture laden desiccant. This process requires the application of heat to said second column of regeneration air, heat being available from the heat pipe that transfers heat from said first column of dehumidified air to said second column of regeneration air (or the third air column) and/or from any supplementary heat source. In carrying out this invention, there are two supplementary heat sources, one a heater means per se, and the other a waste heat transfer means from combined equipment. In practice, said heater means is a direct gas fired heater or an electric heater, and said waste heat transfer means is a condenser coil of a refrigeration compressor-condenser unit used in combination with this or a number of these stand-alone air pre-conditioner unit. It is an object of this invention to advantageously employ this waste heat for the benefit of both the air pre-conditioner unit herein disclosed and also the compressor-condenser unit from which the heat is taken. That is, efficiency of both units is enhanced, utilizing condenser coils in parallel and preferably in series, and one of which is in the aforementioned second regeneration air column.

A primary objective of this invention is to provide an air pre-conditioner unit that is convertible so as to have the capability of several ducting configurations, to be employed as circumstances require. Accordingly, there is a first ducting assigned solely to the aforesaid first column of air that is dehumidified, there is a second ducting for desiccant regeneration and exhausted, there is a third ducting for utilizing and/or removal of heat from the dehumidified air column, and there is a fourth ducting that is shared with the aforesaid second and third ducting; the second ducting column solely for desiccant regeneration, and the third column solely for removal of heat and exhausted. In carrying out this invention, the above stated ducting conversions are achieved by providing partitions applied to the permanent duct structures, as will be described, to rout the air columns as required. There are no partitions applied to the first mentioned air column. However, partitions are applied to the second, third and fourth mentioned ductings. The second and third mentioned air column ductings are partitioned as shown in FIG. 10 so as to implement split outside air flow continuity through the third mentioned ducting to exhaust, and parallel flow through the second mentioned ducting to exhaust, said split outside air rejoining for exhaust. The same second and third mentioned air column ductings are partitioned as shown in FIG. 11 so as to implement outside air flow continuity through the third mentioned ducting, then through the fourth mentioned ducting and then through the second mentioned ducting to exhaust. The basic convertible air pre-conditioner unit is shown in FIG. 1 without the partitions, fourth duct and modules that are employed to implement the operative configurations shown in FIGS. 10 and 11.

By using the condenser coils in parallel, the size of the refrigeration unit or compressor unit condenser coil is substantially reduced, which is a cost saving feature. And, by using the condenser coils in series, the total refrigerant flow is diverted, first to be cooled by the aforementioned second column of regeneration air for maximized heat absorption and then to the compressor unit condenser coil of substantially reduced and smaller size, whereby considerably less energy is expended to complete the condensing-cooling process and with a comensurate cost saving in the use of energy.

An object of this invention is to advantageously combine the instant air pre-conditioner unit with refrigeration-condenser units that supply usable refrigerant to fan-coil units. With the present invention, efficiency of the compressor-condenser unit is increased while removing waste heat of compression therefrom. Said waste heat is then supplemented in the air pre-conditioner unit and used for regenerating the dilute desiccant. A feature of this refrigerant circuit is the second condenser in parallel or in series, the latter being preferred and having the advantage of removing heat so that the compressor-condenser unit operates more efficiently by rejecting heat at lower condenser temperature and pressure, and with the result that a smaller condenser coil can be used. This waste heat use circuit is applicable to both conventional fan-coil and compressor units, and to separate min-split units, as shown herein.

The air pre-conditioner unit is versatile in its application to both old and new construction, with or without refrigeration air conditioning, and with or without dehumidification, it being an object of this invention to provide dehumidification where it is desired or previously difficient, and in whatever climatic condition. Return air from the air conditioned space together with a minimum of outside air is pre-conditioned and a maximum of outside air is returned through fan-coil refrigeration units. It is an object of this invention to provide a pre-conditioner unit that coordinates the air flow columns while dehumidifying the air delivered through the fan-coil refrigeration units in the air conditioned space.

Another feature of this invention is the use of evaporative cooling to improve the heat pipe function of removing heat from the first mentioned ducting. This feature is implemented when relatively dry outside or return air is available. An evaporation module is installed as will be described, to close an access opening provided therefor.

SUMMARY OF THE INVENTION

The inventive concept herein disclosed provides a versatile air pre-conditioner that is adapted to be implemented in various configurations as a stand-alone unit, in that it is self sufficient, if need be, to humidify or dehumidify incoming air. Outside air and/or return air from conditioned space is processed, with or without refrigeration, to be dehumidified in hot-wet climate, and humidified in cold-dry climate conditions. The structural configuration of this air pre-conditioner can vary widely, as to size, shape and disposition of the ducting means therein, and characterized by two dedicated ducting means, and at least one additional ducting means that processes waste heat from the desiccant dehumification process employed therein, the quantity of said waste heat being adequate but lacking in temperature. Accordingly, a supplemental heater means is provided to furnish the difference for effective regeneration of weakened desiccant. The need for supplemental heat is greatly reduced when this air pre-conditioner is combined with a refrigeration system wherein substantial amount of heat is available from the waste heat of compression. To this end, a maximum amount of heat is taken from the condenser circuit of the refrigeration system, by placing a second condenser coil in parallel or preferably in series therewith, the advantage of which has been described.

A feature of this invention is the singular unit design that is convertible to many installation requirements and situations, a compact design without wasted space and utilized to best advantage with energy savings by maximum use of waste heat from whatever heat source and especially from the condenser circuit of the associated refrigeration air conditioning system.

The foregoing and various other objects and features of this invention will be apparent and fully understood from the following detailed description of the typical preferred forms and applications thereof, throughout which description reference is made to the accompanying drawings.

THE DRAWINGS

FIG. 1 is a longitudinal side view of the basic multi-use air pre-conditioner in its non implemented condition, this and the following drawing figures being schematic.

FIGS. 2, 3 and 4 are sectional views taken as indicated by lines 2—2, 3—3 and 4—4 on FIG. 1.

FIG. 5 is a longitudinal side view of a duct (ducting means D) that is adapted to the basic structure of FIG. 1 to rout regeneration air as may be required.

FIGS. 6 and 7 are sectional views taken as indicated by lines 6—6 and 7—7 on FIG. 5 and similar to FIGS. 3 and 4 in that they include the corresponding structure of FIG. 1.

Figure 15:
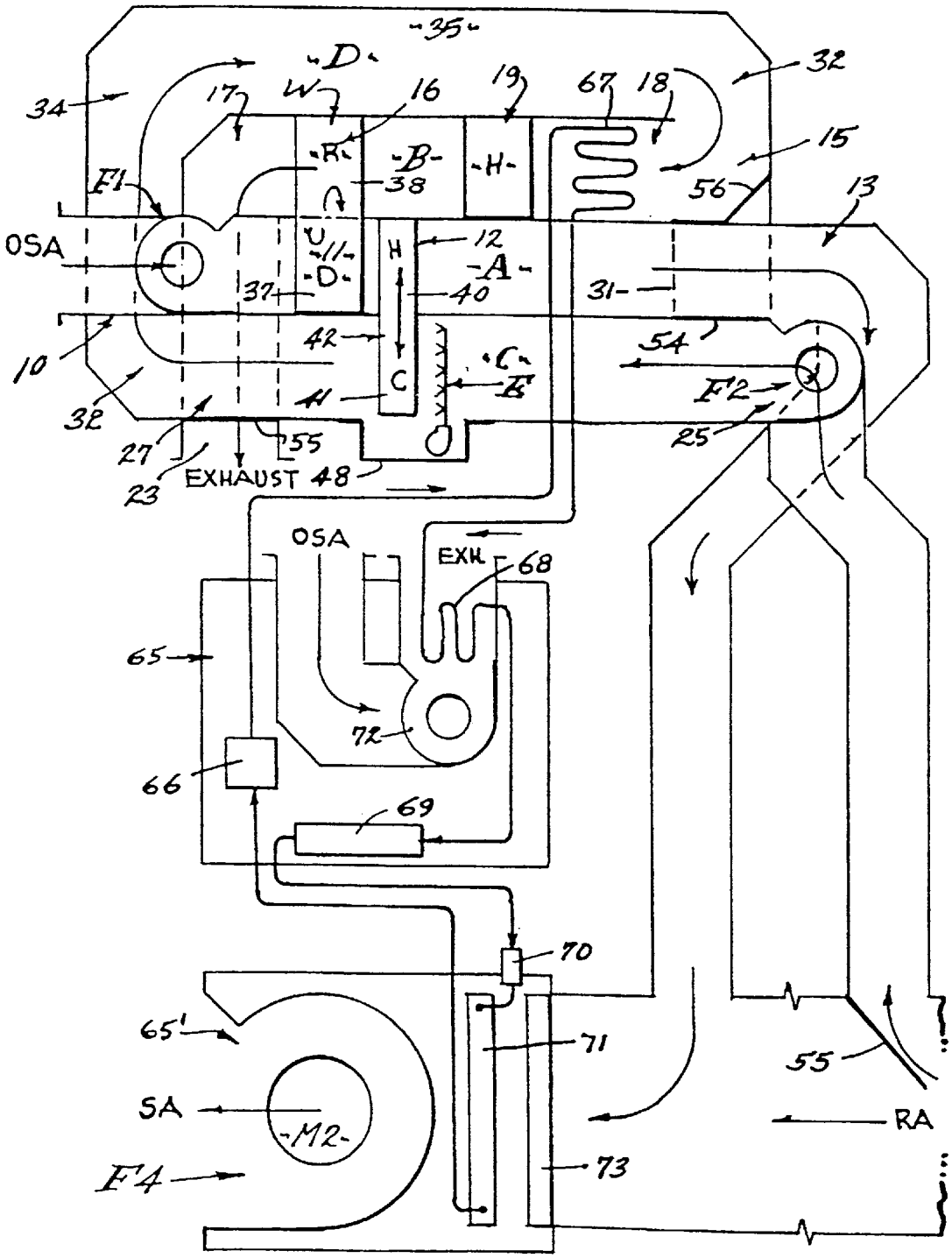
FIG. 15 is a view of the pre-conditioner implemented as it is in FIG. 11, showing it in working combination with a ductless or mini-split combination of a fan unit and a compressor-condenser unit, and with a second condenser coil in series with the condenser coil of the latter unit thereof.

And FIG. 17 is a schematic of a typical system installation involving ductless or mini-split units as shown in FIG. 15, the air pre-conditioner being implemented as shown in FIG. 15.

PREFERRED EMBODIMENTS

Referring now to FIGS. 1–4 of the drawings, the multi-use air pre-conditioner PC is shown in its basic non implemented and ready to operate condition, comprised generally of a first ducting means A dedicated to humidification and dehumidification of a column of air, a second ducting means B dedicated to regenerating weakened desiccant when operating in the dehumidification mode, a third ducting means C utilized with a heat transfer means T to remove heat from the first mentioned ducting means, and a fourth adaptable ducting means D that is shared with ducting means B and C and utilized with said heat transfer means T and return air through ducting means C and ducting means B for regeneration. The second ducting means B houses heater means H that supplements the waste heat of absorption from heat transfer means T, and from the refrigeration condenser coil when it is implemented. An evaporative cooling means E is provided for insertion into the ducting means C so as to increase the effectiveness of the heat transfer means T. Placement spaces for opening and closures therefor, and for ducting means D and module E are provided in the ducting means B and C, as will be described as they are incorporated in each of said means to implement the functions required. Desiccant dehumidification is carried out by a desiccant wheel W with diametrically opposite segments thereof rotated by motor means M through the cross sections of ducts A and B, as shown. In carrying out this invention and it its preferred form, there are basically two columns of air reversely transported through ducting means A and B by means of blowers or fans F1 and F2, as shown. Implementation of this air pre-conditioner is by installation therein of predetermined closure partitions, duct means D and module E as may be required and as clearly shown in FIGS. 10 and 11.

Figure 1:
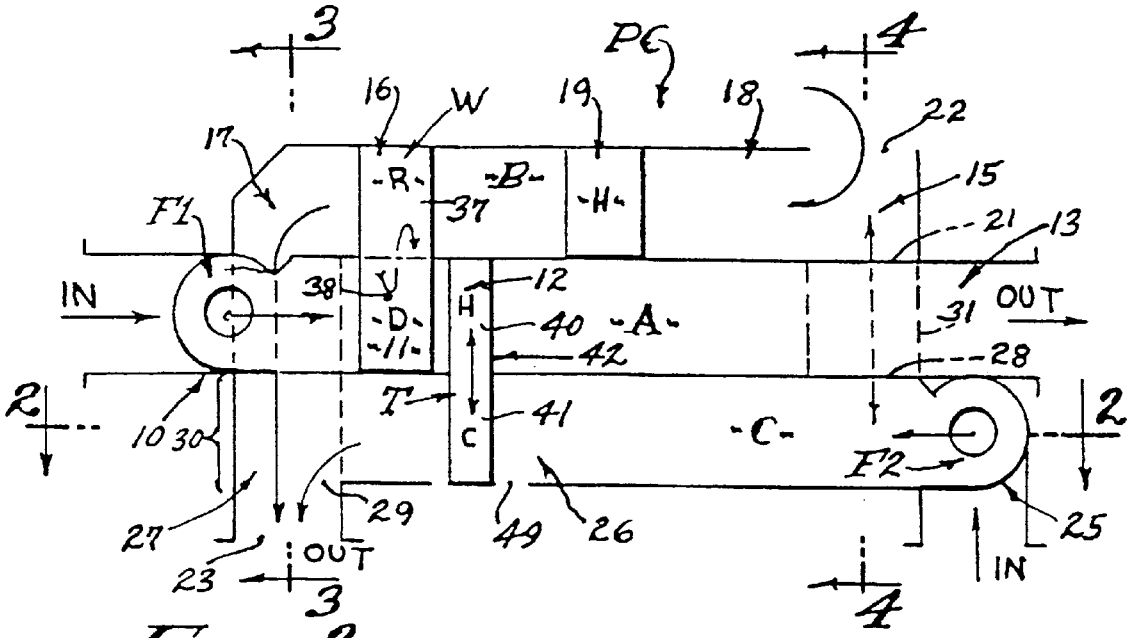

The ducting means A dedicated to the dehumidification of a column of air (in a normal dehumidifying mode) is clearly shown in FIG. 1 as a longitudinally disposed through duct for left to right air flow. In order to carry out the air pre-conditioning process involved, the ducting means A has an intake section 10, an air processing section 11, a heat transfer section 12, and a discharge section 13. The intake section is open to receive outside air or to receive return air from the conditioned air space, and either receives blower air or preferably houses the intake fan F1 for delivery of an air column through the desiccant wheel W and heat transfer means T and discharge from section 13 as supply air to conditioned space.

The ducting means B dedicated to regeneration by a column of air (in a normal dehumidification mode) is clearly shown in FIG. 1 as a longitudinally through duct for reverse right to left air flow. A feature of this invention is that the ducting means B is contiguous to and disposed alongside the ducting means A and is substantially coextensive with said ducting means A. In order to carry out the air pre-conditioning process involved, the ducting means B has an intake section 15 alongside section 13 of means A, an air processing section 16 alongside section 11 of means A, and a discharge section 17 alongside section 10 of means A. And, in accordance with this invention, ducting means B has a waste heat section 18 and a supplemental heat section 19 intermediate the sections 15 and 16 thereof. [The section 18 houses the heater means T and the] *The* section 19 houses the supplemental heater means H. Whereas the ducting means A is essentially an imperforate duct, the ducting means B is characterized by flow control means spaces for openings, and closures, and air column directing means, as follows:

The intake section 15 is open laterally in at least one and preferably two directions, a first direction to receive blower air from duct C, and a second direction to receive recirculated waste heat air through duct D. As shown, the ducting means B overlies the ducting means A, and the ducting means C, next described, underlies said ducting means A, in which case the intake section 15 has a first downwardly disposed flow control means 21 space (see FIG. 2) which is initially open or can be opened to the duct C and/or to an intake fan F2. And, the intake section 15 has a second upwardly disposed flow control means 22 space (see FIG. 4) which is initially open or can be opened to the duct D for recirculation of waste heat from duct C and driven by said intake fan F2, as will be described. The discharge section 17 of ducting means B is an imperforate duct directed downwardly alongside the intake section 10 of means A to exhaust at 23 (see FIG. 2).

The ducting means C transports the regeneration air column either directly through the ducting means B or indirectly though the waste heat transfer means T, and alternately to exhaust at 23' (see FIG. 1). Means C is a longitudinally disposed duct for reverse right to left flow and is contiguous to and disposed alongside of the ducting means A and is substantially coextensive with said ducting means A. In order to carry out this air pre-conditioning process, the ducting means C has an intake section 25 alongside 13 of means A, a heat transfer section 26, and a discharge section 27 alongside section 10 of means A. The intake section 25 is open to receive outside air or to receive return air from the conditioned air space, and either receives blower air or preferably houses the intake fan F2 for delivery of the regeneration air column through the desiccant wheel W, and alternately through the heat transfer means T to discharge from exhaust at 23 or 23'. Like the means B, ducting means C is characterized by placement spaces for openings and closures, and air column directors, and air processing modules, as follows:

The intake section 25 is open laterally and/or endwise in at least one and preferably several places, to split off blower air from fan F2 and to exhaust air at 23', or to recirculate said blower air through duct D next described. As shown, the ducting means C underlies the ducting means A and has a first laterally disposed flow control means 28 space (see FIG. 4) which is initially open or can be opened to duct B, at the delivery side of fan F2. The discharge 23' at section 27 is disposed alongside the duct B discharge 23, there being a second flow control means 29 space (see FIGS. 2 and 3) which is initially open or can be opened to exhaust at 23', and there being a third flow control means space 30 (see FIGS. 2 and 3) which is initially open or can be opened to recirculate regeneration air from duct C through duct D to duct B. The flow control means 30 space is indicated by a bracket in FIG. 1, the exhausts at 23 and 23' discharging side by side as shown in FIG. 3.

Figure 2:
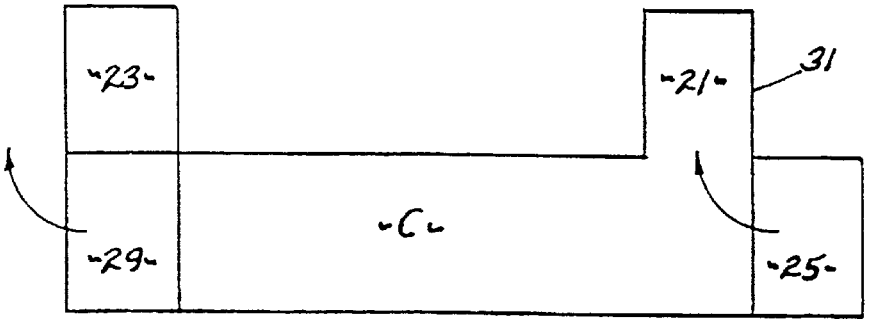
Figure 3:
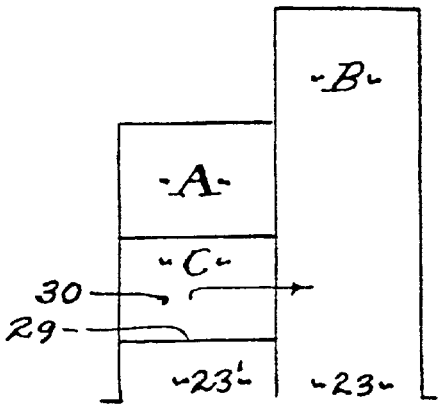
Figure 4:
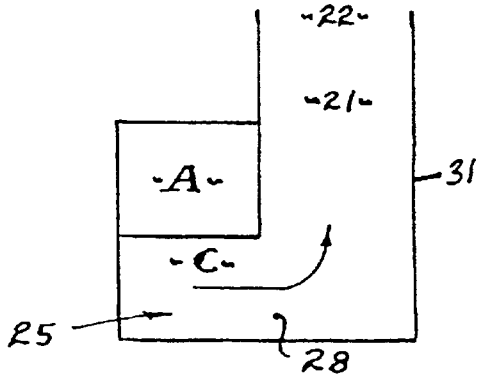
Figure 5:
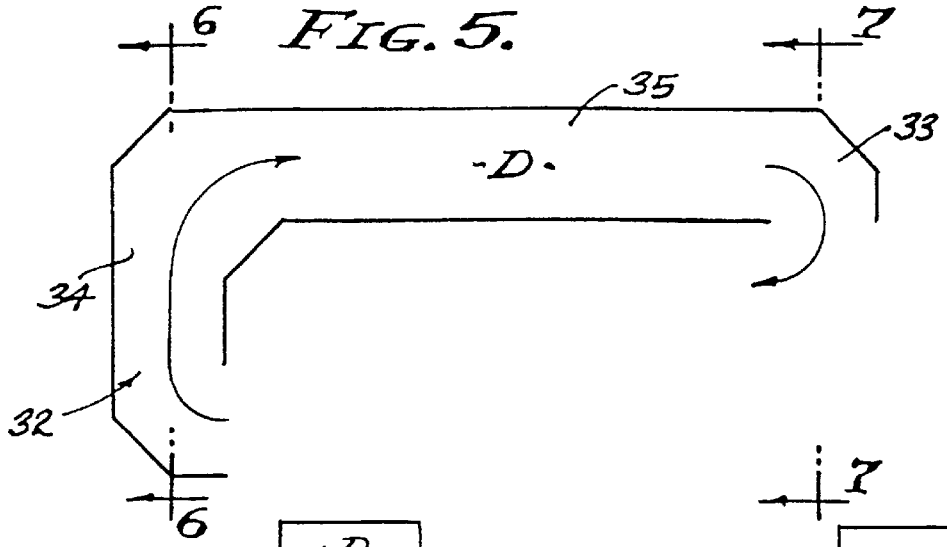
Figure 6:
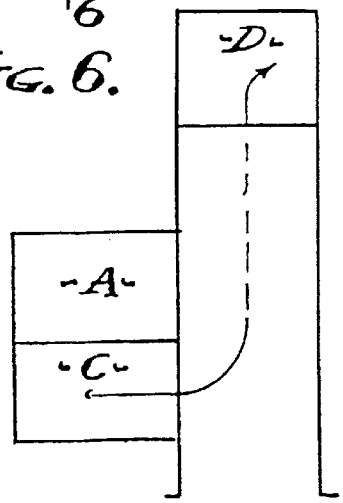
Figure 7:
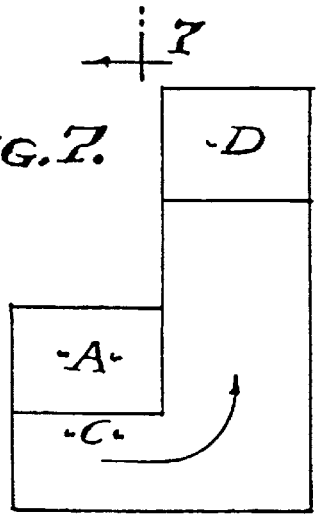
Figure 8:
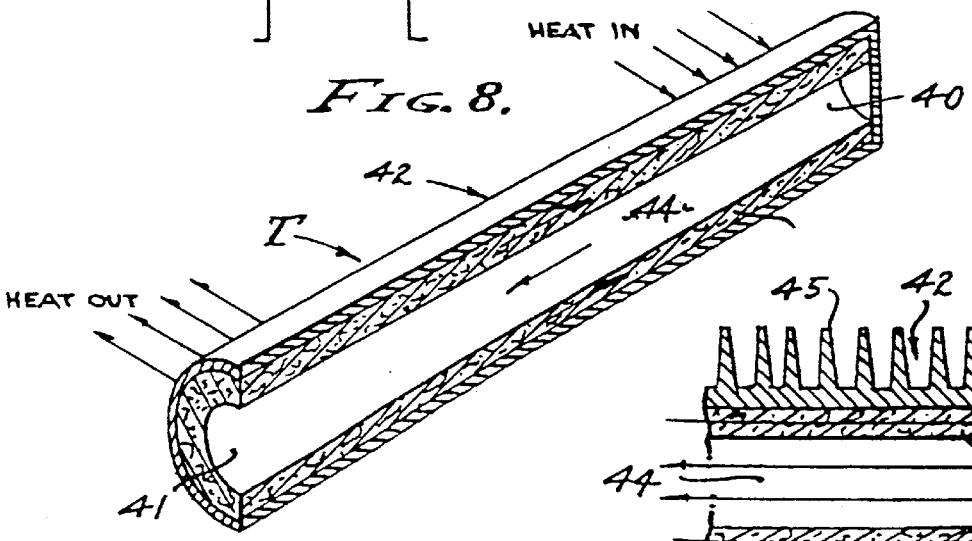
FIG. 8 is a perspective fragmentary section of a heat pipe configuration employed herein as the heat transfer means; and P

The ducting means C and ducting means B are initially in open or can be in open communication through a coupler duct means 31 that extends between the flow means 28 space of duct C and the means 21 space of duct B (see FIGS. 1, 2 and 4).

The ducting means D recirculates regeneration air from ducting means C to the ducting means B for the addition thereto of supplemental heat by means H and waste compressor heat. The recirculated air first absorbs heat at the waste heat transfer means T. Ducting means D is a longitudinally disposed duct for left to right flow of an air column and is contiguous to and disposed alongside of the ducting means B and is substantially coextensive with said ducting means B. Means D is essentially an air transfer duct that wraps around the left end of ducting means A and C and coextensively overlies the ducting means B. The ducting means D is characterized by an intake section 32 alongside the discharge section 27 of means C, and a discharge section 33 alongside of the intake section 15 of means B. Like the means B and C, ducting means D is characterized by flow control means spaces for openings and closures, and for air column directors, as follows:

The intake section 32 is open endwise and/or laterally into a vertical riser 34 that turns right into a horizontal duct 35 overlying the duct B. The discharge section 33 continues from duct 35 and opens downwardly at the top of section 15 of duct B. A feature is the replaceability of means D, essentially an attachment used as and when required.

Figure 12:
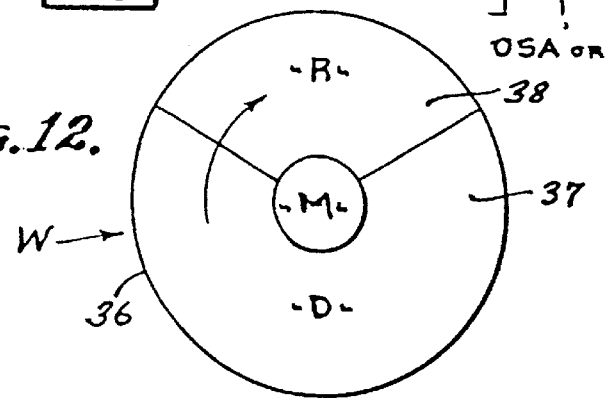
FIG. 12 is an illustration of a desiccant wheel as it is used herein, to show the movement and areas thereof applied to dehumification and to regeneration (normal application).

Humidity conditioning herein is by a desiccant dehumidifying means, preferably of the wheel type W as shown. Wheel W can vary in form as may be required, and is shown as a rotating cylinder 36 of the regenerating type having a dehumidifying segment 37 in the intake air ducting means A, and having a regenerating segment 38 in the exhaust air ducting means B. Proportionate use of these two segments is variable and depends upon the volumetric flow ratio of the two opposing air streams and the available temperature of regeneration air immediately prior to entering the regenerating segment 38 (see FIG. 12). The higher the regeneration temperature, the smaller the area needed for segment 38 for regeneration and the larger is the available area of segment 37 for enhanced flow capacity at a given face velocity. Where this ratio is 2 to 1, as shown in FIG. 12, approximately two thirds of the desiccant wheel is devoted to segment 37 for dehumidification by absorbing moisture, while one third is devoted to segment 38 for regeneration of the weakened moisture saturated by desiccant. Regeneration of weakened desiccant is by means of heated or tempered air delivered through ducting means B, wherein waste heat is recovered from the refrigeration means and supplemental heat is applied by heating means H as needed to achieve the desired inlet regenerating air temperature to segment 38. The desiccant wheel W is shown in FIG. 12 as a packed-type cylinder comprising a suitable air permeable desiccant material of, for example, alumina, silica gel, lithium chloride or suitable hygroscopic polymers, and the like.

Figure 9:
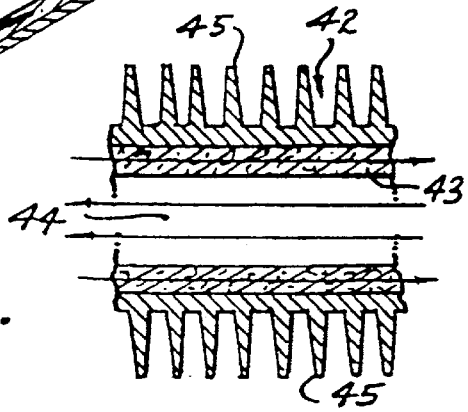
FIG. 9 is an enlarged fragmentary sectional view showing an improved finned heat pipe and its internal heat flow.

The heat transfer means T removes the heat resulting from absorption of moisture into the desiccant and is positioned immediately downstream from the desiccant wheel section 37. The means T is in the form of heat pipes 42 characterized by a hot end 40 for the absorption of heat, and by a cold end 41 for the dissipation of heat. In other words, there is a "heat in" end 40 and a "heat out" end 41. In carrying out this invention, the heat-in end 40 is placed in the ducting means A following moisture absorption by the desiccant, while the heat-out end 41 is placed in the ducting means C for dissipation of heat into exhaust air at 23'. Accordingly, there is a heat transfer that occurs between ducting means A and ducting means C, by means of a bank comprised of a multiplicity of heat pipes 42, the hot ends 41 in the form of heat absorbers, and the cold ends in the form of heat dissipators. In practice, the heat pipes 42 are short lengths of heat conductive tubing sealed at their opposite ends, having fitting tubular wick lining 43 and charged with a refrigerant 44, a gas-liquid. A temperature differential between the ends of each pipe 42 causes the refrigerant 44 therein to migrate by capillary action to the warmer end where evaporation thereof takes place and absorbs heat. The resultant refrigerant vapor then returns through the hollow tube center of the wick lining 43 and to the cooler end 41 of the pipe 42 where it gives up the heat carried thereby, by condensing into the wick lining 43, and repeating the cycle. The heat transfer process is efficient, as the heat pipes 42 are sealed and have no moving parts, and require little or no maintenance. As shown in FIG. 9, the heat pipes 42 are finned at 45 for efficient heat energy transfer.

The heater means H completes the heating requirement for effective regeneration of the desiccant in segment 37 of the desiccant wheel W. Means H is a gas fired or an electric powered furnace that heats the column of air passing through duct B and through the regenerative segment of the wheel W. Means H is thermostatically controlled and brings the column of air to regenerating temperature, whether pre-heated by waste heat or not. The amount of available waste heat will determine the required capacity of the heater means H, and in practice the application of waste heat at section 18 of the ducting means B preceeds the application of supplemental heat by said means H.

Figure 14:
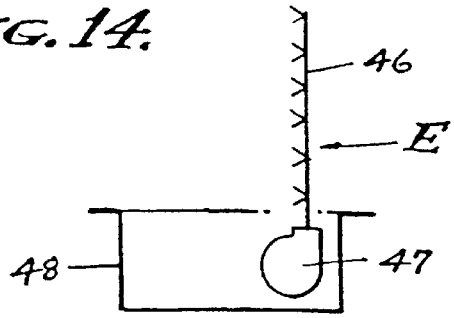
FIG. 14 is an enlarged view of the evaporative cooler module as it is shown employed in FIGS. 11, 13 and 15.

The evaporative cooler means E conditions the cold ends of the heat pipes 42 for effective dissipation of heat energy absorbed by the hot ends 41 thereof. As shown in FIG. 14, the means E involves a spray bar 46 supplied with an evaporative liquid, water, by a pump 47 drawing said liquid from a sump 48. The sump 48 provides a closure for a flow control means 49 space provided therefor in the bottom side of ducting means C, and supports the spray bar 46 upstream of the bank of heat pipes 42 to evaporatively cool the cold "heat-out" ends 41 thereof. The evaporative cooler module E is installed as and when required.

During the summer and similar warm weather, the heat pipes 42 function as shown in the drawings to support the dehumidification process performed by this air preconditioner. However, during the winter and similar cold weather, the heat pipes 42 function automatically in a reverse direction of heat transfer, achieved by deactivating the heater means H and also the evaporative cooling module E, but retaining full operation of the desiccant wheel W, thereby pre-heating and humidifying incoming air through ducting means A.

Figure 10:
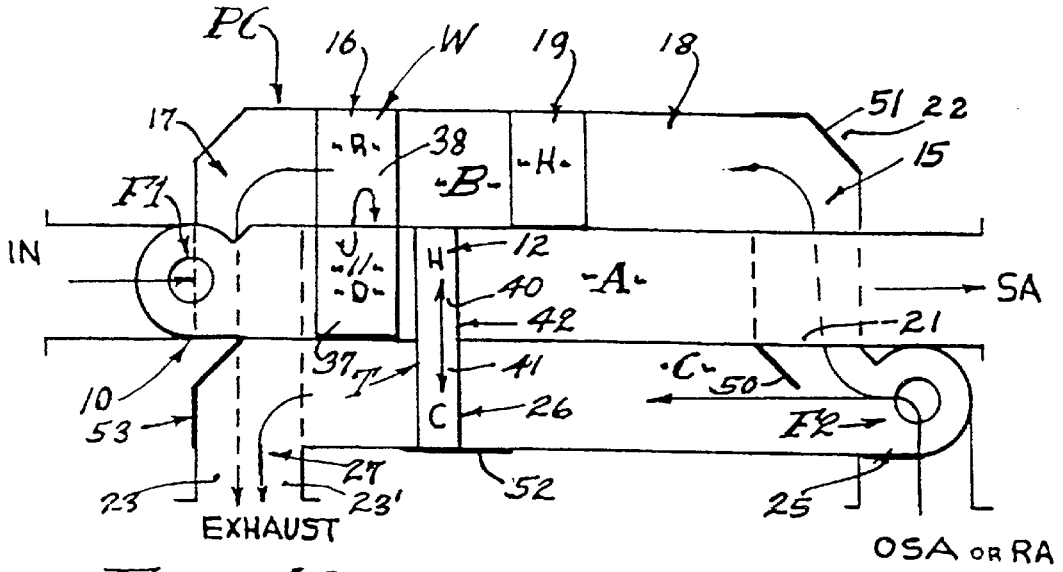
FIGS. 10 and 11 are each longitudinal side views of the basic structure of FIG. 1, illustrating the two conversions of this pre-conditioner as they are implemented by the partitions, ducts, and modules applied thereto.

A basic condition 1 implementation of the air pre-conditioner PC is shown in FIG. 10 of the drawings, wherein the structural combination of ducting means A, B and C is made functional for stand-alone operation of the unit to dehumidify a conditioned space. Accordingly, outside air (OSA) is delivered to ducting means C by the fan F2, a flow splitter member 50 being installed in the flow means space 28 to divert a portion of the air flow into the coupler duct means 31 for delivery through flow means 21 space and into the intake section 15 of ducting means B. The ducting means A is dedicated to and dehumidifies the conditioned air space, taking in return air at intake section 10, and delivering supply air (SA) at discharge section 13. The flow means 22 space of ducting means B is closed by a corner member 51 that turns the split off portion of the fan driven air column to flow through the heater means H and regeneration segment 37 of the desiccant wheel W. The remaining portion of the split air flow is driven through the bank of heat pipes 42 of the heat transfer means T to remove heat of absorption from the dehumidification process in ducting means A. Air flow through and exhaust from the ducting means C is by means of a closure member 52 installed in the flow means 49 space, and by a corner member 53 installed in the flow means 30 space. Accordingly, discharge of duct C is at exhaust 23'.

Figure 11:
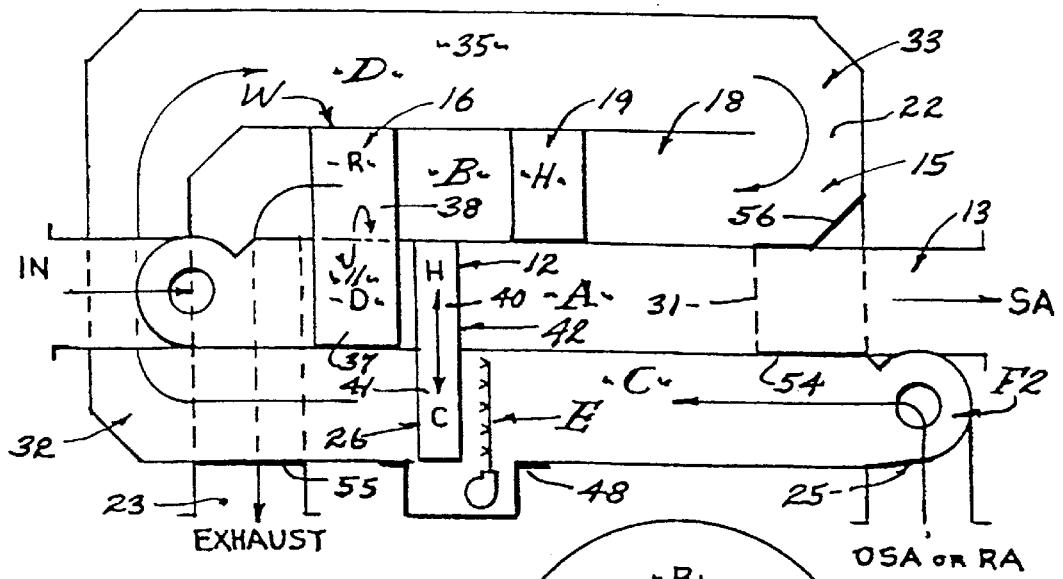

A condition 2 dehumidification heat recovery implementation of the air pre-conditioner PC is shown in FIG. 11 of the drawings, wherein the structural combination of ducting means A, B, C and D is made functional for stand-alone operation of the unit to dehumidify an air conditioned space. Additionally, waste heat recovery is assisted by the evaporative cooler module E. The ducting means A is dedicated to and dehumidifies the conditioned air space, taking in return air (RA) or outside air (OSA) at air intake section 10, and delivering supply air (SA) at discharge section 13. Accordingly, outside air (OSA), or return air (RA) is delivered to ducting means C by the fan F2, a closure member 54 being installed in flow means 28 space, and a closure member 55 being installed in flow means 29 space, so as to confine air flow through the duct C and through the bank of heat pipes 42 dissipating waste heat from the dehumidifying process. The ducting means D is incorporated in the unit structure, or installed as an attachment, with its intake section 32 open from the flow means 30 space, and with its discharge section 33 open into the flow means 22 space of the ducting means B. Thus, all of the air delivered by fan F2 is passed through the heat dissipating ends 41 of the heat pipes and through the waste heat section 18 of duct B. A corner member 56 is installed in the flow control means 21 space to close the coupling duct 31 and to direct air flow through the supplemental heater means H and through the regeneration segment of the desiccant wheel W. The discharge section 17 discharges the air flow alongside the discharge section 27 of duct C for exhaust at 23 alongside the exhaust of duct C at 23'.

The evaporative cooler module E is installed in the placement space 49, closing the same, and operating to evaporatively cool the heat dissipating ends 41 of the heat pipes 42, so as to enhance their efficient operation.

Figure 13:
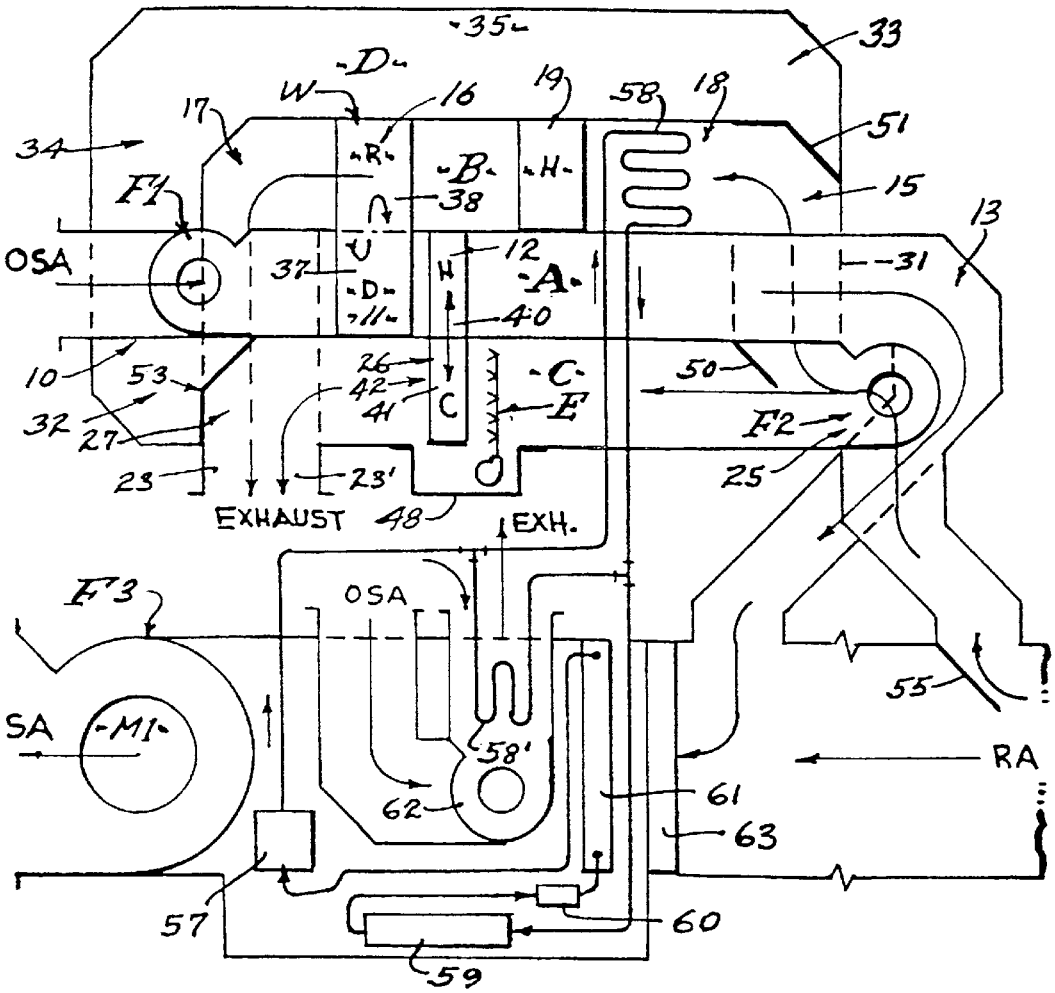
FIG. 13 is a view of the pre-conditioner implemented as it is in FIG. 10, showing it in working combination with a fan-coil compressor package unit air conditioner, and with a second condenser coil in parallel with the condenser coil of the compressor section of the package unit.

A package air conditioner combination utilizing basic implementation is shown in FIG. 13 of the drawings, wherein refrigeration waste heat of compression assists the desiccant regeneration process, with recovery of waste heat of absorption in the dehumidification process. In this embodiment the use of placement spaces and splitter member 50 and corner member 51 and 53 is as above described and shown in the embodiment of FIG. 10, and the evaporative cooler module E is installed as a closure for placement space 49 as in the embodiment of FIG. 11. This is another basic implementation wherein heat of compression from the package unit air conditioner, an A/C unit, is advantageously employed as a primary source of heat for regenerating weakened desiccant. As shown, the A/C unit is self contained and includes a fan F3 driven by a motor M1 for drawing return air (RA) from the air conditioned space. A portion of said return air is split off at 55 and delivered by fan F3 to the ducting means B and C, as above described, and subsequently exhausted at 23 and 23'. The compressor 57 delivers hot compressed refrigerant fluid through a primary condenser coil 58 for maximum heat extraction in the waste heat section 18 of ducting means B. A secondary condenser coil 58' is in fluid parallel with coil 57 that is in the A/C unit for assuring complete condensation of said fluid. The condensed fluid is coalesced in a receiver 59 and then passed through a thermal expansion valve 60 for heat extraction in the refrigeration coil 61. Coil 58' of reduced size is cooled by a blower 62. Supply air (SA) from the ducting means A is returned to the air conditioned space through the A/C unit ahead of its filter 63, and delivered as supply air (SA) by the fan F3. Maximized heat extraction by coil 57 significantly reduces the size requirement of the heater means H, the regeneration air being previously heated by the heat transfer means T.

A split compressor and fan-coil combination utilizing basic implementation is shown in FIG. 15 of the drawings, wherein refrigeration waste heat of compression assists the desiccant regeneration process, with recovery of waste heat of absorption in the dehumidification process. In this embodiment the use of placement spaces and closure members 54 and 55 and corner member 56 is as above described and shown in the embodiment of FIG. 11, and the evaporative cooler module E is installed as a closure for placement space 29 as in the embodiment of FIG. 11. This is another basic implementation wherein heat of compression from the mini-split compressor unit 65 is advantageously employed as a primary source of heat for regenerating weakened desiccant. As shown, the refrigeration system is split into the compressor unit 65 and the fan-coil unit 65' with a fan F4 driven by a motor M2 for drawing return air (RA) from the air conditioned space. A portion of said return air is split off at 55 and delivered by fan F2 to the ducting means C, as above described, and subsequently exhausted at 23. The compressor 66 delivers hot compressed refrigerant fluid through a primary condenser coil 67 for maximum heat extraction in the waste heat section 18 of ducting means B. A secondary condenser coil 68 is in fluid series with coil 67 and is of substantially reduced size in the compressor unit 65, for assuring complete condensation of said fluid. The condensed fluid is coalesced in a receiver 69 and then passed through a thermal expansion valve 70 for heat extraction in the refrigeration coil 71. The coil 68 is cooled by a blower 72. Supply air (SA) from the ducting means A is returned to the air conditioned space through the fan-coil unit 65' ahead of its filter 73, and delivered as supply air (SA) by the fan F4 thereof. Maximized heat extraction by coil 67 significantly reduces the size requirement of the heater means H, the regeneration air being previously heated by the heat transfer means T. Further, a feature of this series condenser configuration is that the maximum heat extraction at coil 67, minimizes the size requirement for the compressor unit coil 68, with a comensurate reduction in energy required of the compressor unit to cool the same.

Figure 16:
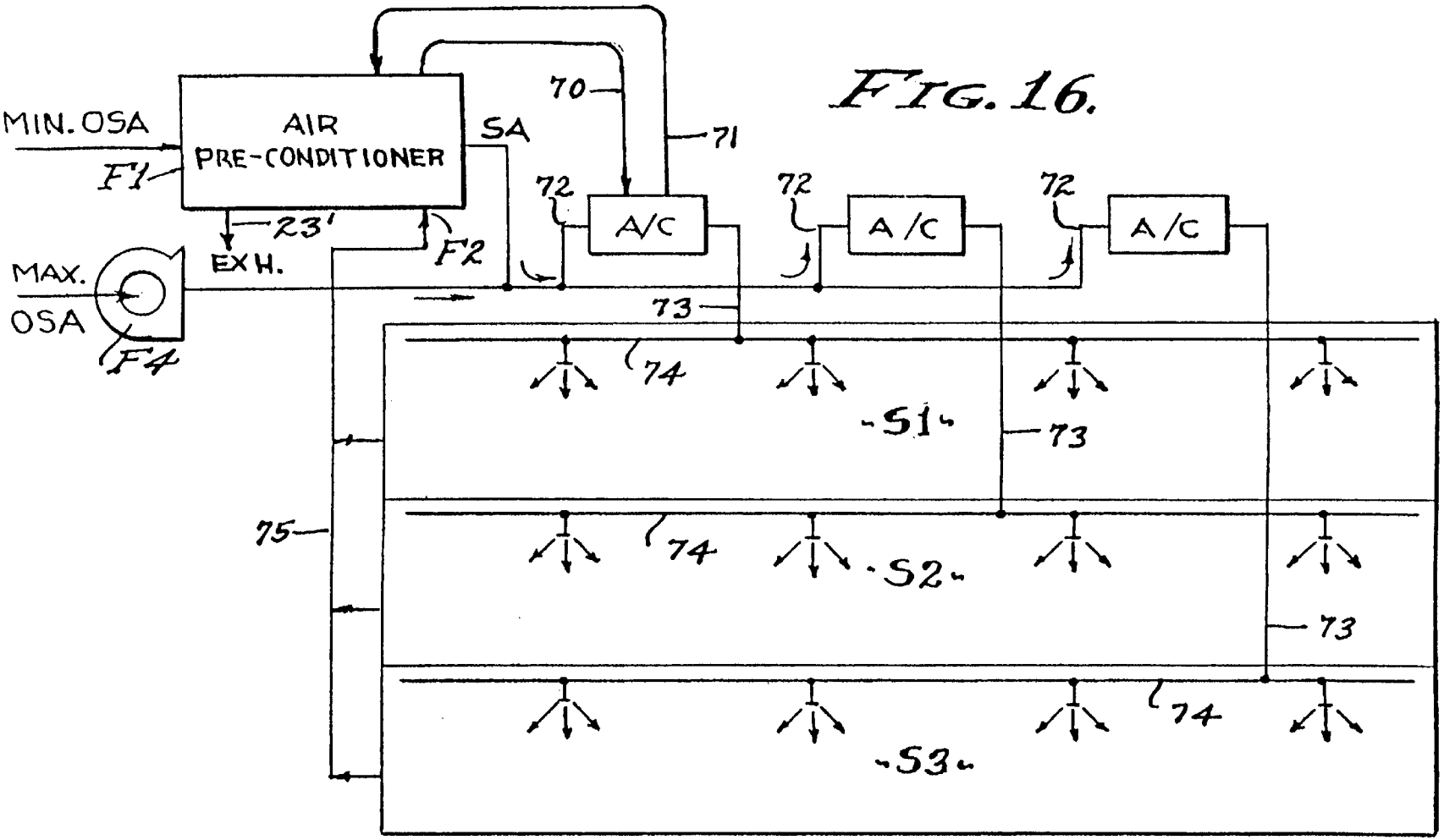
FIG. 16 is a schematic of a typical system installation involving fan-coil compressor package units as shown in FIG. 13, the air pre-conditioner being implemented as shown in FIG. 13.
Figure 12:
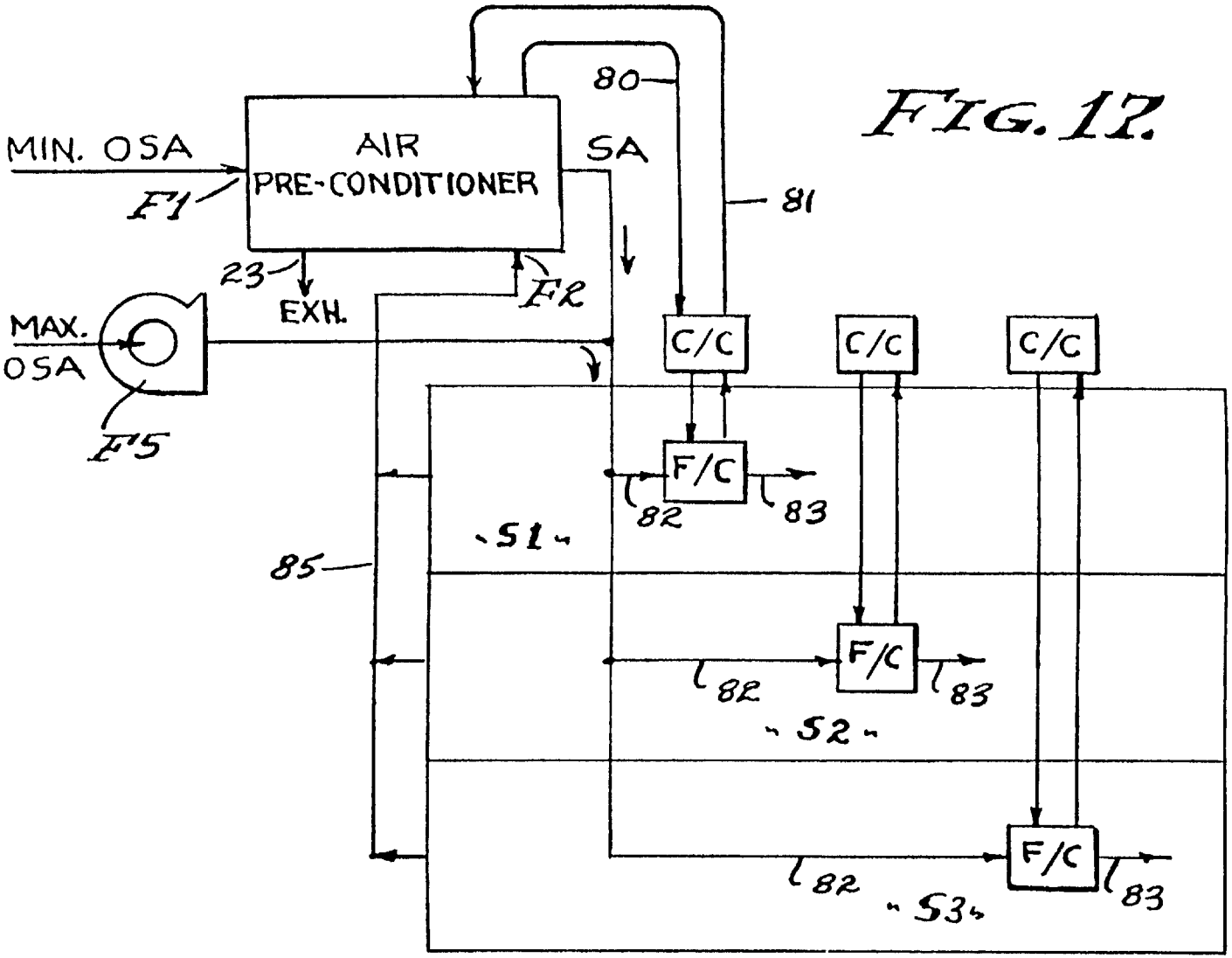

In accordance with this invention, the air pre-conditioner PC as it is shown in FIG. 1 and as implemented in FIG. 10, is combined with a multiplicity of package air conditioners A/C as shown in FIG. 16 of the drawings. In practice, one pre-conditioner PC can serve at least three A/C units. The FIG. 10 implementation takes in outside air OSA by means of fan F1 to be dehumidified and discharged as supply air SA; and takes in return air RA by means of fan F2 for transfer of heat out of said supply air and discharged as exhaust air at 23'. It is to be understood that the implementation of FIG. 11 can be substituted for the basic FIG. 10 implementation, as it is later described. The air pre-conditioner PC now under consideration is in fluid circuit, in parallel as shown, with one of the multiplicity of air refrigeration package unit A/C via a pressure and a return line 70 and 71. Supply air SA from the pre-conditioner PC is delivered to each A/C package unit via a duct 72, where it is refrigerated for discharge into an air conditioned space S1–S3 via supply air ducts 73. Distribution ducts 74 are employed if and when required. In practice, a minimum of outside air OSA enters through the air pre-conditioner PC; and as and when required a maximum of outside air OSA is supplemented by a blower fan F4. Return air RA from air space S1–S3 is via ducting 75 to the intake fan F2 of the pre-conditioner PC for heat dissipation and exhaust at 23'.

In accordance with this invention, the air pre-conditioner PC as it is shown in FIG. 1 and as implemented in FIG. 11, is combined with a multiplicity of "ductless" or "Mini-split" refrigeration air conditioning systems comprised of separate compressor units C/C and fan-coil units F/C, as shown in FIG. 17 of the drawings. In practice, one pre-conditioner PC can serve at least three mini-split systems as shown. The FIG. 11 implementation takes in outside air OSA by means of fan F1 to be dehumidified and discharged as supply air SA; and takes in return air RA by means of fan F2 for transfer of heat out of supply air SA and for absorption of waste heat of compression from a compressor unit C/C, and discharge or exhaust at 23. It is to be understood that the implementation of FIG. 10 can be substituted for the basic FIG. 11 implementation, as it is previously described. The air pre-conditioner PC now under consideration is in fluid circuit, series as shown, with one of the multiplicity of compressor units C/C via a pressure line and return line 80 and 81. Supply air SA from the pre-conditioner PC is delivered to each fan-coil unit F/C via a duct 82, where it is refrigerated for discharge directly into an air conditioned space S1–S3 via its discharge 83. distribution ducts are not required. In practice, a minimum of outside air OSA enters through the air pre-conditioner PC; and as and when required a maximum of outside air OSA is supplemented by a blower fan F5. Return air RA from air space S1–S3 is via ducting 85 to the intake fan F2 of the pre-conditioner PC for heat dissipation and exhaust at 23.

Although the mini-split C/C-F/C and A/C package configurations are described as "air conditioners", some or all in a given building system can also be operated as heat pumps. Heat pumps are known to provide capability for reversing cycle, as by means of a reversing valve (not shown) reversing flow between the evaporator and condensing coils. Since the pre-conditioner PC conditions outside air OSA, and since the heating winter cycle will require humidification of outside air, refrigerant waste heat from the condenser coil at the compressor of unit C/C will extract heat by connecting it as a heat pump, the hook-up of FIG. 13 is preferred over the series hook-up of FIG. 15 for this reverse operation, since the pre-conditioner PC coil 57 can be isolated. When humidification is not required and operating reversely as a heat pump, return air will serve as an additional heat source prior to its discharge at the exhaust. Note that this air pre-conditioning and refrigeration air conditioning system works equally well with either air-cooled or liquid cooled condeners. And, control means (not shown) for the air pre-conditioner PC can be a suitable microprocessor humidistat, to control the desiccant wheel, evaporative sprays, heater H application, and compressor waste heat, and also the air circulation fans F1–F5. This pre-conditioned air alone or as combined with the several types of refrigeration air conditioners, will benefit economically by employing the total availability of waste heat and by applying dehumification where it increases efficiency in both the dehumification and refrigeration processes.

Having described only the typical preferred forms and applications of my invention, I do not wish to be limited or restricted to the specific details herein set forth, but wish to reserve to myself any modifications or variations that may appear to those skilled in the art, as set forth within the limits of the following claims.

I claim:

1. A convertible desiccant assisted air pre-conditioner for implemented use to dehumidify an air column delivered into an air conditioned space, and including;

a first ducting means dedicated to dehumidification of incoming air at an intake end and delivering supply air at a discharge end for conditioning said air conditioned space, a second ducting means dedicated to desiccant regeneration by means of return air from said air conditioned space, there being at least one air flow control means at an intake end of the second ducting means, a third ducting means for receiving return air at an intake end and delivering exhaust air at a discharge end, there being one air flow control means space at the intake end of the third ducting means and at least one air flow control means space at the discharge end of the third ducting means, a coupler means duct open between the at least one air flow control means at an intake end of the second ducting means and said one flow control means space at the intake end of the third ducting means, desiccant dehumidifying means exposed to an air column flowing through the first ducting means for dehumidification and exposed to an air column flowing through the second ducting means for regeneration of weakened desiccant, heater means for tempering the air column to a regenerating temperature through the second ducting means, and heat transfer means exposed to air columns flowing through each of said first and third ducting means.

2. The desiccant assisted air pre-conditioner as set forth in claim 1, wherein useful implementation is by means of a flow splitter member fixed in said one flow control means space at the intake end of the third ducting means and splitting intake air between the third ducting means and said coupler ducting means, and a corner member fixed in said at least one flow control means space at the intake end of the second ducting means and turning a split off portion of the air flow through the second ducting means and through the heating means and the desiccant dehumidifying means exposed therein and passing a portion thereof through the third ducting means and through the heat transfer means exposed therein, whereby dehumidified air flows from the discharge end of the first ducting means at reduced temperature assisted by the transfer of heat of absorption to air flow exhausted from the discharge end of the third ducting means, and weakened desiccant regenerated by means of the heated air column flowing through the dehumidifier means exposed in the second ducting means.

3. The desiccant assisted air pre-conditioner as set forth in claim 1, wherein the desiccant dehumidifying means is of wheel configuration having a dehumidifying segment exposed into the air column in the first ducting means and having a regenerating segment exposed into the air column in the second ducting means, and with motor means for revolving the wheel.

4. The desiccant assisted air pre-conditioner as set forth in claim 1, wherein the heat transfer means is comprised of at least one heat pipe having a hot end exposed in the first ducting means downstream of the dehumidifying means for absorbing heat, and having a cold end exposed in the third ducting means for dissipating said heat.

5. The desiccant assisted air pre-conditioner as set forth in claim 4, there being an air flow control means space intermediate the intake and discharge ends of the third ducting means and upstream of the heat transfer means exposed therein, and wherein an evaporative cooler means is fixed in said last mentioned control means space for assisting the cold end of the heat pipe to dissipate heat.

6. The desiccant assisted air pre-conditioner as set forth in claim 2, wherein the desiccant dehumidifying means is of wheel configuration having a dehumidifying segment exposed into the air column in the first ducting means and having a regenerating segment exposed into the air column in the second ducting means, and with motor means for revolving the same.

7. The desiccant assisted air pre-conditioner as set forth in claim 2, wherein the heat transfer means is comprised of at least one heat pipe having a hot end exposed in the first ducting means downstream of the dehumidifying means for absorbing heat, and having a cold end exposed in the third ducting means for dissipating heat.

8. The desiccant assisted air pre-conditioner as set forth in claim 7, there being an air flow control means space intermediate the intake and discharge ends of the third ducting means and upstream of the heat transfer means exposed therein, and wherein an evaporative cooler means is fixed in said last mentioned control means space for assisting the cold end of the heat pipe to dissipate heat.

9. The desiccant assisted air pre-conditioner as set forth in claim 1, wherein a first fan means at the intake end of the first ducting means transports conditioned air therethrough, and a second fan means at the intake end of the third ducting means transports regeneration air therethrough.

10. The desiccant assisted air pre-conditioner as set forth in claim 2, wherein a first fan means at the intake end of the first ducting means transports conditioned air therethrough, and a second fan means at the intake end of the third ducting means transports regeneration air therethrough.

11. The desiccant assisted air pre-conditioner as set forth in claim 2 and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the said refrigerant condenser, whereby refrigerant heat of compression is applied to the regeneration air and supplemented by the heating means for maintaining a regeneration temperature, and reducing energy to cool applied by the refrigeration air conditioner.

12. The desiccant assisted air pre-conditioner as set forth in claim 3 and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the said refrigerant condenser, whereby refrigerant heat of compression is applied to the regeneration air and supplemented by the heating means for maintaining a regeneration temperature, and reducing energy to cool applied by the refrigeration air conditioner.

13. The desiccant assisted air pre-conditioner as set forth in claim 4 and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the said refrigerant condenser, whereby refrigerant heat of compression is applied to the regeneration air and supplemented by the heating means for maintaining a regeneration temperature, and reducing energy to cool applied by the refrigeration air conditioner.

14. The desiccant assisted air pre-conditioner as set forth in claim 5 and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the said refrigerant condenser, whereby refrigerant heat of compression is applied to the regeneration air and supplemented by the heating means for maintaining a regeneration temperature, and reducing energy to cool applied by the refrigeration air conditioner.

15. The desiccant assisted air pre-conditioner as set forth in claim 2 and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the condenser circuit in parallel with said refrigerant condenser, whereby refrigerant heat of compression is applied to the regeneration air and supplemented by the heating means for maintaining a regeneration temperature, and reducing energy to cool applied by the refrigeration air conditioner.

16. The desiccant assisted air pre-conditioner as set forth in claim 2, and in combination with at least one refrigeration air conditioner system comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the condenser circuit in series with said refrigerant condenser, whereby refrigerant heat of compression is applied to the regeneration air and supplemented by the heating means for maintaining a regeneration temperature, and reducing energy to cool applied by the refrigeration air conditioner.

17. The desiccant assisted air pre-conditioner as set forth in claim 1, wherein useful implementation is by means of a closure member fixed in said one control means space at the intake end of the third ducting means and closing the coupler duct means thereto, a closure member fixed in said at least one flow control means space at the discharge end of the second ducting means space and closing the coupler duct means thereto and leaving an open control means space, a closure member fixed in said at least one control means space at the discharge end of the third ducting means and leaving an open flow control means space, there being a fourth ducting means attached to the second ducting means and in open communication between the open flow control space at the discharge end of the third ducting means and the open flow control means space at the intake end of the second ducting means, whereby dehumidified air flows from the discharge end of the first ducting means at reduced temperature assisted by the transfer of heat of absorption to the column of air through the fourth ducting means as regeneration air through the second ducting means and through the dehumidifying means exposed therein for regenerating weakened desiccant.

18. The desiccant assisted air pre-conditioner and refrigeration air conditioner combination as set forth in claim 17, wherein the desiccant dehumidifying means is of wheel configuration having a dehumidifying segment exposed into the air column in the first ducting means and having a regenerating segment exposed into the air column in the second ducting means, and with motor means for revolving the same.

19. The desiccant assisted air pre-conditioner and refrigeration air conditioner combination as set forth in claim 17, wherein the heat transfer means is comprised of at least one heat pipe having a hot end exposed in the first ducting means downstream of the dehumidifying means for absorbing heat, and having a cold end exposed in the third ducting means for dissipating said heat.

20. The desiccant assisted air pre-conditioner and refrigeration air conditioner combination as set forth in claim 19, there being an air flow control means space intermediate the intake and discharge ends of the third ducting means and upstream of the heat means exposed therein, and wherein an evaporative cooler means is fixed in said last mentioned control means space for assisting the cold end of the heat pipe to dissipate heat.

21. The desiccant assisted air pre-conditioner and refrigeration air conditioner combination as set forth in claim 17, wherein a first fan means at the intake end of the first ducting means transports conditioned air therethrough, and a second fan means at the intake end of the third ducting means transports regeneration air therethrough.

22. The desiccant assisted air pre-conditioner and refrigeration air conditioner combination as set forth in claim 17, wherein the refrigeration air conditioner is comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the said refrigerant condenser, whereby refrigerant heat of compression is applied to the regeneration air and supplemented by the heating means for maintaining a regeneration temperature, and reducing energy to cool applied by the refrigeration compressor-condenser unit.

23. The desiccant assisted air pre-conditioner and refrigeration air conditioner combination as set forth in claim 17, wherein the refrigeration air conditioner is comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the condenser circuit in parallel with said refrigerant condenser, whereby refrigerant heat of compression is applied to the regeneration air and supplemented by the heating means for maintaining a regeneration temperature, and reducing energy to cool applied by the refrigeration air compressor-condenser unit.

24. The desiccant assisted air pre-conditioner and refrigeration air conditioner combination as set forth in claim 17, wherein the refrigeration air conditioner is comprised of a refrigerant compressor, a refrigerant condenser for removal of heat of compression, a thermal expansion valve and refrigeration coil with refrigerant return to the compressor, wherein the second ducting means of the pre-conditioner has a supplemental heat section in which the said heating means is exposed together with a condenser section comprised of a substantial portion of the condenser circuit in series with said refrigerant condenser, whereby refrigerant heat of compression is applied to the regeneration air and supplemented by the heating means for maintaining a regeneration temperature, and reducing energy to cool applied by the refrigeration air compressor-condenser unit.

25. A desiccant assisted air pre-conditioner implemented to pre-condition outside air delivered to a multiplicity of refrigeration air conditioner units and each of which is comprised of a refrigerant compressor, a refrigerant condenser for removal of heat of compression, a thermal expansion valve and refrigeration coil with refrigerant return to the compressor, the air pre-conditioner including:

a first ducting means dedicated to dehumidification of incoming outside air with discharge ducting to each of said multiplicity of refrigeration air conditioner units, a second ducting means dedicated to desiccant regeneration by means of return air therethrough to exhausting from the air space conditioned by said multiplicity of refrigeration conditioner units, a third ducting means for receiving said return air and delivering it to said second ducting means, a desiccant dehumidifying means exposed into the first ducting means for dehumidifying the air flow therethrough and exposed into the second ducting means for regeneration of weakened desiccant, a heat transfer means exposed to the air flow from the dehumidifying means exposed into said first ducting means to absorb heat and exposed into the air flow through the third ducting means to dissipate heat into the air flow therethrough, a substantial portion of said refrigerant condenser of one of said multiplicity of refrigeration air conditioner units being exposed in the second ducting means for dissipating heat of compression to the regeneration air flow therethrough, and a heater means exposed in the second ducting means for supplementing said heat transfer means heat dissipation and said heat of compression condenser portion dissipation to maintain regeneration temperature.

26. A desiccant assisted air pre-conditioner implemented to pre-condition outside air delivered to a multiplicity of refrigeration compressor units and each of which is comprised of a refrigerant compressor, a refrigerant condenser for removal of heat of compression for delivery to separate fan-coil units comprised of a thermal expansion valve, a refrigeration coil and ductless fan and with refrigerant return to the compressor, the air pre-conditioner including:

a first ducting means dedicated to dehumidification of incoming outside air with discharge ducting to each of said multiplicity of fan-coil units, a second ducting means dedicated to desiccant regeneration by means of return air therethrough and to exhausting from the air space conditioned by said multiplicity of fan-coil units, a third ducting means for receiving said return air and delivering it to said second ducting means, a desiccant dehumidifying means exposed into the first ducting means for dehumidifying the air flow therethrough and exposed into the second ducting means for regeneration of weakened desiccant, a heat transfer means exposed to the air flow from the dehumidifying means exposed into said first ducting means to absorb heat and exposed into the air flow through the third ducting means to dissipate heat into the air flow therethrough, a substantial portion of said refrigerant condenser of one of said multiplicity of compressor units being exposed in the second ducting means for dissipating heat of compression to the regeneration therethrough, and a heater means exposed in the second ducting means for supplementing said heat transfer means heat dissipation and said heat of compression condenser portion dissipation to maintain regeneration temperature.

*27. A heat pump and desiccant space conditioning system which operates on process air taken from within or outside of a conditioned space, and regenerative air taken from within or outside of said conditioned space comprising:*

*(a) dehumidification apparatus for adsorbing water vapor from process air;*

*(b) heat transfer apparatus for transferring heat from said process air, at a location downstream from said dehumidification apparatus, to said regenerative air;*

*(c) heating and cooling apparatus for selectively cooling said process air and heating regenerative air by phase change of a refrigerant; and*

*(d) apparatus for selectively directing said refrigerant through said heating and cooling apparatus for heating or cooling.*

*28. Apparatus as in claim 27 in which said system comprises a single integral unit.*

*29. Apparatus as in claim 27 in which said system comprises a stand-alone pre-conditioner with ductwork connected to conduct air to and from remote refrigeration apparatus.*

*30. Apparatus as in claim 29 in which said refrigeration apparatus comprises separate interconnected compressor and fan-coil units.*

*31. Apparatus as in claim 27 in which said heating and cooling apparatus includes a pair of interconnected condenser coils, one of which is in the flow path of said regenerative air.*

*32. Apparatus as in claim 31 in which said coils are connected in parallel with respect to refrigerant flow.*

*33. Apparatus as in claim 27 in which said apparatus for transferring heat includes a heat transfer device in contact with both said process air and said regenerative air, with evaporative cooling means.*

*34. Apparatus as in claim 33 in which said heat transfer device comprises a plurality of heat pipes with said evaporative cooling means spraying cooling liquid on one end of said heat pipes.*

*35. Apparatus as in claim 27 in which said control apparatus is adapted to reverse the direction of flow of said refrigerant.*

*36. A method of heating, cooling and dehumidifying air in a space to be conditioned utilizing process air taken from within or outside of said space and regeneration air taken from within or outside of said space, said method comprising the steps of:*

*(a) providing a refrigeration and heating device in which the flow direction of refrigerant can be reversed to cause refrigeration in one mode or operation and heating in another mode of operation;*

*(b) during cooling, treating process air with a desiccant to dehumidify it;*

*(c) transferring heat from said process air to said regeneration air by use of heat transfer means contacting both said process air, after dehumidification, and said regeneration air;*

*(d) contacting said process air with expansion coils of said refrigeration and heating device to cool said process air;*

*(e) contacting said regeneration air with condenser coils of said refrigeration and heating device to heat said regeneration air and then flowing said regeneration air over said desiccant to regenerate it;*

*(f) supplying said process air to said space after dehumidification and cooling;*

*(g) when heating is desired, reversing the flow of refrigerant in said expansion coils to produce heating of said process air.*

*37. A method as in claim 36 including the step of cooling said regeneration air into which heat is transferred from said process air.*

*38. A method as in claim 36, in which said refrigeration and heating device has primary and secondary condenser coils connected in parallel, said primary condenser coils being the ones contacting said regeneration air, and isolating said primary coils during heating use of said device.*

*39. A method as in claim 36 in which said desiccant is in the form of a desiccant wheel.*

*40. A method as in claim 36 in which the heat transfer step is performed by use of a heat pipe transfer device with evaporative cooling of said heat pipe transfer device.*

*41. A method as in claim 36 including locating said refrigerating and heating device in a single integrated unit.*

*42. A method as in claim 36 including locating said refrigerating heating device in a location remote from the location at which treating said process air with a desiccant is done.*

*43. A method as in claim 36 including providing a plurality of said heating and refrigeration units, and a single pre-conditioning unit supplying de-humidified process air to each of said heating and refrigeration units.*

* * * * *